United States Patent [19]

Kuroiwa et al.

[11] 4,142,407

[45] Mar. 6, 1979

[54] AIR FLOW METERING APPARATUS FOR INTERNAL COMBUSTION ENGINES

[75] Inventors: Hiroshi Kuroiwa, Hitachi; Yoshishige Ohyama; Yutaka Nishimura, both of Katsuta; Nobuaki Miyakawa, Hitachi, all of Japan

[73] Assignee: Hitachi, Ltd., Japan

[21] Appl. No.: 797,690

[22] Filed: May 17, 1977

[30] Foreign Application Priority Data

May 26, 1976 [JP] Japan .................. 51-60104

[51] Int. Cl.$^2$ .................. G01F 1/32; G01F 5/00
[52] U.S. Cl. .................. 73/118; 73/194 VS; 73/197
[58] Field of Search .................. 73/118, 194 VS, 197; 123/32 EA, 32 EJ

[56] References Cited

U.S. PATENT DOCUMENTS

| | | | |
|---|---|---|---|
| 1,935,445 | 11/1933 | Heinz | 73/194 |
| 2,807,448 | 9/1957 | Morton | 261/41 X |
| 3,529,469 | 9/1970 | Gauthier | 73/113 |
| 3,691,824 | 9/1972 | Vanderbilt, Jr. | 73/118 |
| 3,722,275 | 3/1973 | Rodely | 73/194 |
| 3,803,912 | 4/1974 | Ohno | 73/195 |
| 3,965,730 | 6/1976 | Innes | 73/118 |
| 4,050,428 | 9/1977 | Masaki | 123/32 EA |

*Primary Examiner*—Herbert Goldstein
*Attorney, Agent, or Firm*—Craig & Antonelli

[57] ABSTRACT

An air flow metering apparatus for measuring a suction air flow fed to an internal combustion engine comprises at least two Kármán' vortex type air flow meters disposed separately in at least two air suction passages, respectively. The output signals from the flow meters are switched in such manner that in a predetermined range of high air flow rates, the output signal from one of the flow meter is utilized for measuring or sensing the air flow rate, while in a predetermined low flow rate range, the output signal from the other flow meter is utilized for the same purpose. Alternatively, in a predetermined low flow rate range, only one of the air suction passages is employed, while both of the air suction passages are employed in a predetermined range of high air flow rates. The air flow metering apparatus assures the detection or measurement of the suction air flow rate over a whole operation range of the engine with a high reliability and enhanced accuracy.

11 Claims, 11 Drawing Figures

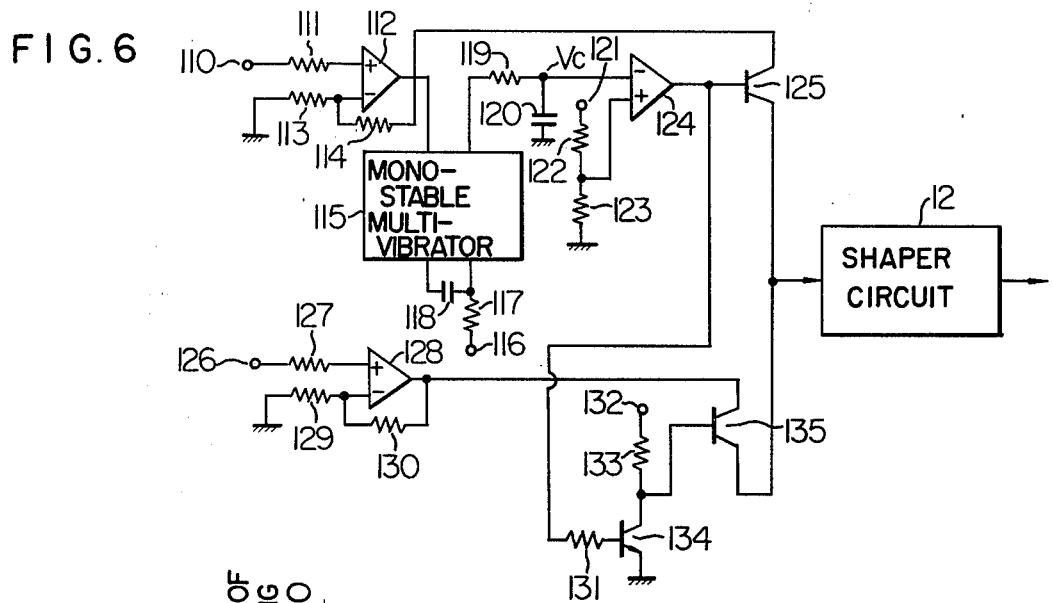
FIG. 6
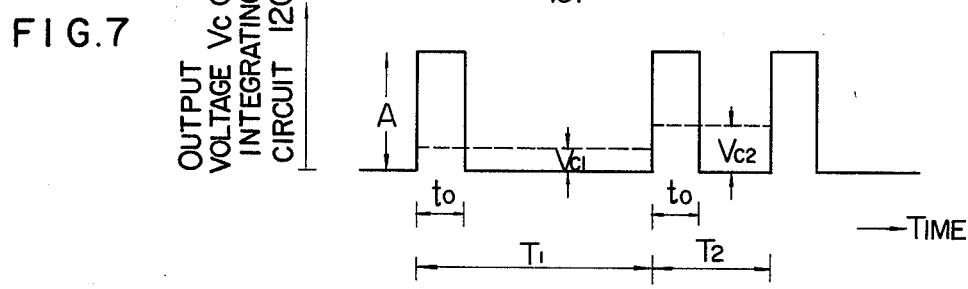
FIG. 7
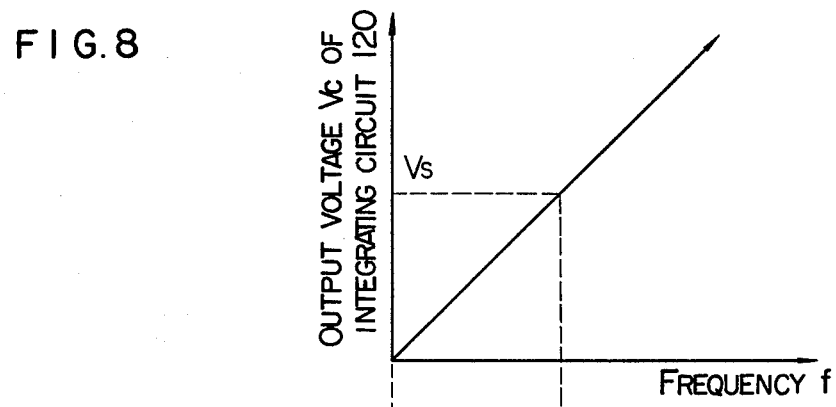
FIG. 8
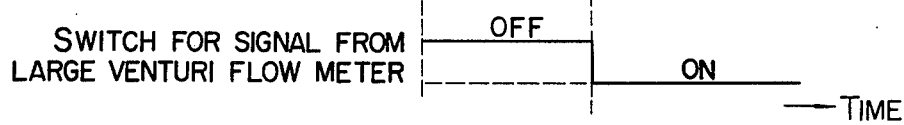
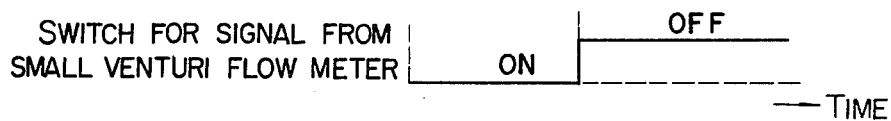

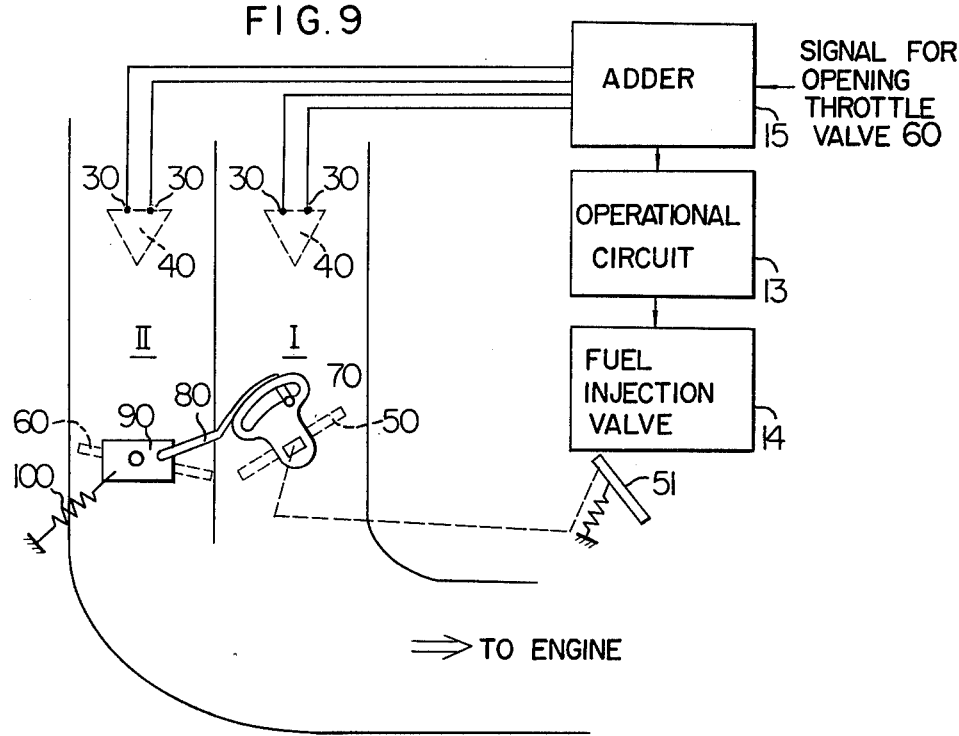
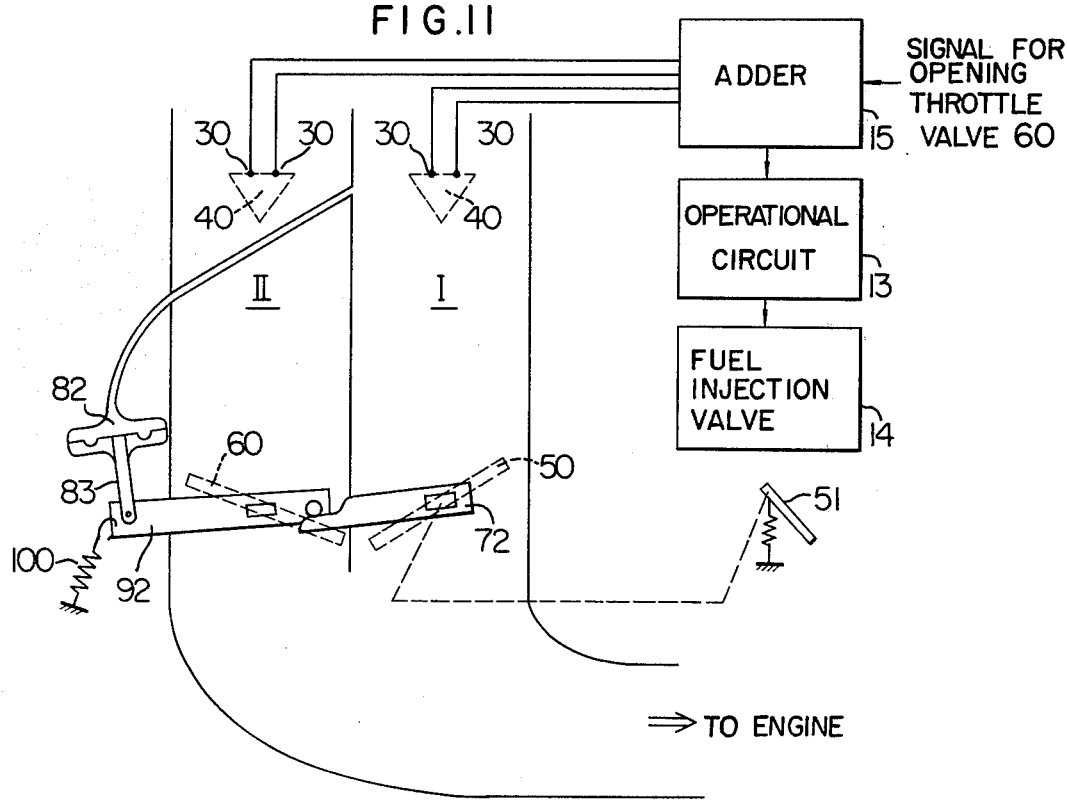

AIR FLOW METERING APPARATUS FOR INTERNAL COMBUSTION ENGINES

BACKGROUND OF THE INVENTION

1. Field of the Invention

The present invention relates in general to an apparatus for detecting a suction air flow rate necessary for controlling an internal combustion engine and in particular to an air flow meter for detecting a suction air flow rate by utilizing Kármán' vortex generation.

2. Description of the Prior Art

As the statutory restrictions on the exhaust gases of internal combustion engines becomes severe, there arise many problems in the carbureter in respect of the controllability of ratio of air and fuel in a combustible mixture, distribution of the fuel mixture to combustion chambers, changes in properties of air-fuel mixture as a function of time, heat resistance property or the like, which makes more difficult the processing of the exhaust gas. Under the circumstance an electronic fuel injection or jetting apparatus has come into practical use which significantly avoids the above disadvantages and is adapted to control the fuel flow independence on detected operating states of an associated internal combustion engine with the aid of parameters such as aperture of a throttle valve, negative suction pressure and number of revolutions of an engine. At present, such electronic fuel jetting injection is gaining a large share of the commercial field and is increasingly employed in place of the stationary carbureter of Venturi type. However, since expensive parts are required in the fuel injection valve and the detector device of such electronic fuel injection, high manufacturing costs thereof are involved as compared with the stationary Venturi type carbureter. Accordingly, application of the electronic fuel injection apparatus is at present restricted to a specifical type of motor vehicles such as high class motor cars.

In the light of the fact that expensive sensors are required for detecting the throttle valve aperture, negative suction pressure and the number of revolutions the engine as parameters representative of the operating state of engine, there has been developed another type of electronic fuel injection system which is adapted to detect directly the suction air flow. For example, it is known that a movable air valve which is mounted in an air feeding conduit and is caused to be moved in response to variation in the air flow rate and vary the resistance value of a variable resistor, thereby to produce an electric output signal which is compatible to the air flow rate. Further, a fuel injection system is also known in which a Kármán' vortex type flow meter is utilized. In the former case, however, a high accuracy can not be obtained in the operation since the movable mechanical valve is relatively less sensitive to the variation in the air flow rate. Besides, there arises the possibility that the air valve should be demaged due to the back-fire phenomenon which occurs in the starting operation in the cool state of engine. Further resistance to air suction may be increased, involving decreased output of engine. On the other hand, the system in which the Kármán' vortex type flow meter is used is considered advantageous in that the number and the state of Kármán' vortexes as produced are little influenced by temperature, density, viscosity of air flows and the pressure loss is of a negligible order. Thus, the Kármáns' vortex type flow meter is excellent in respect of the accuracy and reproducibility. For the generation of the Kármán' vortexes, the following equation will validly apply.

$$f = St. (V/D) \qquad (1)$$

where f: frequency at which the vortexes are generated,
St: Strouhal number,
V: velocity of air flow, and
D: diameter of column.

As shown in FIG. 1, the Strouhal number St is substantially constant at about 0.2 when the velocity of suction air flow is in the range of 3 m/sec to 80 m/sec. The range of air flow velocity in which the Strouhal number remains at a constant value will of course be varied in dependence on the geometrical configurations of the vortex generator. In general, the ratio between the Strouhal numbers at the maximum and the minimum flow velocities is on the order of 30 to 40. In the regions outside the range in which the Strouhal number St is constant, the vortex signal becomes extremely unstable and degraded in accuracy for use as the flow velocity signal. On the other hand, in an internal combustion engine which is operated in a normal state, the ratio between the quantities of suction air at the maximum and the minimum flow rates (corresponding to points O' and O in FIG. 2, respectively) is on the order of 50 to 60. Thus, it is difficult to measure the flow rate with an acceptable high accuracy by means of a single Kármán flow meter over the whole operation range of the engine.

SUMMARY OF THE INVENTION

An important object of the invention is to overcome the disadvantages of the hitherto known air flow meters described above and provide a novel and improved air flow meter for internal combustion engines in which the Kármán vortexes stabilized over the whole operation range of the engine are detected thereby to allow the measurement of the air flow with enhanced accuracy.

With above object in view, there is proposed according to one aspect of the invention an air flow meter which comprises a large size Venturi of a conventional type and a small size venturi desposed so that the outlet port of the latter is located at the narrowest portion of the large venturi. A first Kármán voltex type flow meter is disposed at the narrowest parallel portion of the large venturi, while a second Kármán vortex type flow meter is positioned at the narrowest parallel portion of the small size venturi. The first and the second flow meters are separately used in respective predetermined ranges of air flow rates. In more particular, the output signal from the first flow meter disposed at the small size venturi is utilized in a range of high air flow rates, while the output signal from the second flow meter located at the large size Venturi is utilized in a range of low air flow rates. Thus, it is possible to detect stable Kármán vortexes over the whole operation range of the internal combustion engine, thereby to measure the air flow rate with improved accuracy.

According to another aspect of the invention, there are provided at least two suction passages or conduits through which the suction air is fed to the engine. In the range of low air flow rates, only one of the suction conduits is used to increase substantially the air flow rate for measuring the increased air flow rate, while in the range of high air flow rates, the suction air is caused to flow additionally through the other conduit or passage thereby to increase the cross section area of air flow and lower the air flow rate thereby to measure the lowered air flow. In this manner, the Kármán vortexes in a stable state can be detected, which in turn allow the detection of the air flow rate or velocity with high accuracy.

BRIEF DESCRIPTION OF THE DRAWINGS

Above and other objects, novel features and advantages of the invention will become readily more apparent from the description of exemplary embodiments shown, by way of example only, in the accompanying drawings in which:

FIG. 6 shows in detail an electric circuit arrangement of an input switching circuit shown in FIG. 3, FIG. 7 is a waveform diagram showing a relation between output signal from a mono-stable multivibrator 115 and a voltage across a capacitor 120 shown in FIG. 6, FIG. 8 shows graphically input switching characteristics of the switching circuit shown in FIG. 6, FIG. 9 shows schematically in a sectional view a main portion of an air flow meter for an engine according to still another embodiment of the invention along with an associated electronic circuit shown in a block diagram, wherein throttle valves mechanically interlocked with each other are disposed in a first suction conduit and a second suction conduit, respectively, FIG. 11 shows schematically in a sectional view a main portion of an air flow meter constructed in accordance with a further embodiment of the invention along with an associated electric circuit in a block diagram wherein diaphragm means provided in association with a first suction conduit is mechanically inter locked with a throttle valve disposed in a second suction conduit.

DESCRIPTION OF THE PREFERRED EMBODIMENTS

Figure 3:
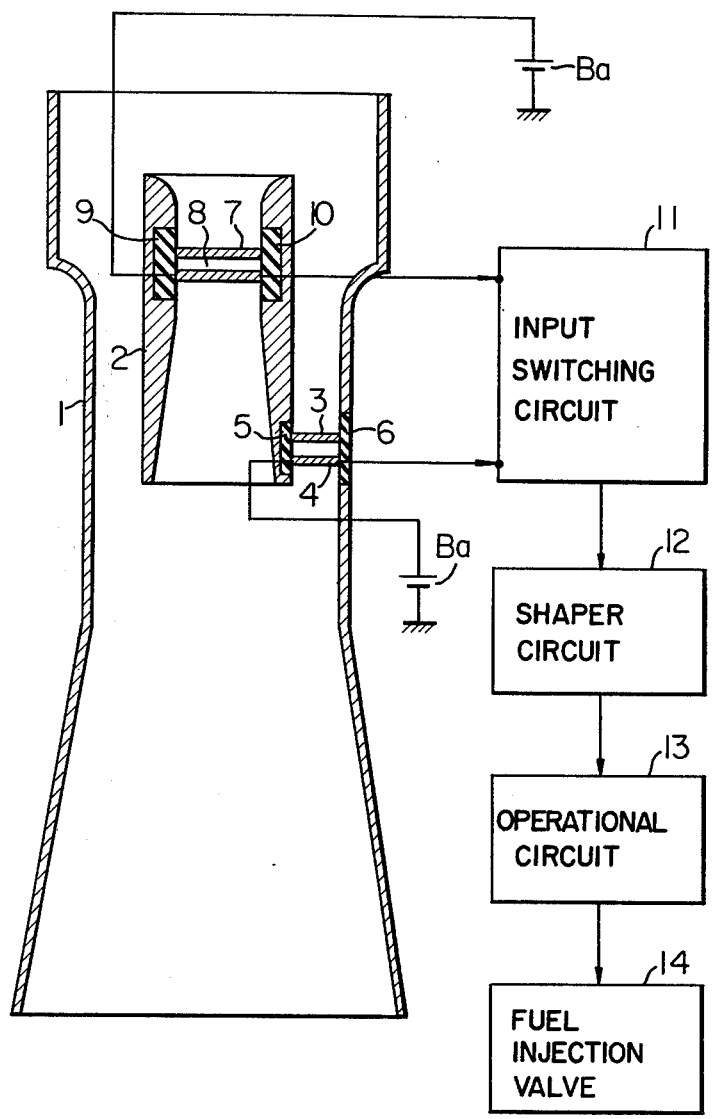
FIG. 3 shows in a cross-sectional view a main portion of an air flow meter for an engine constructed in accordance with an embodiment of the invention along with an associated electronic circuit in a block diagram.

Referring to FIG. 3, numeral 1 denotes a cylindrical venturi body of a large size and 2 denotes a cylindrical venturi body of a small size partially accommodated within the large size venturi body 1. A cylindrical post or column 3 is provided between the narrowest parallel wall portion of the large venturi 1 and a skirt portion of the small venturi 2 at a detecting portion of the large venturi 1 in which the Kármán vortexes are generated. The column 3 extends perpendicularly to the direction of air flow. A hot wire 4 is mounted adjacent and in parallel to the post 3 at the downstream side thereof. The large and small venturi bodies 1 and 2 are electrically insulated from the post 3 and the hot wire 4 by means of insulating members 5 and 6. A cylindrical post or column 7 is provided in the small venturi body 2 at the narrowest portion of a constant diameter at which the generation of Kármán vortexes is detected. The post 7 extends also transversely to the direction of air flow. A hot wire 8 is mounted in the small venturi body 2 adjacent and in parallel to the post 7 at the downstream side thereof. The post 7 and the wire 8 are electrically insulated from the venturi body 2 by means of insulating members 9 and 10. Symbol Ba denotes a d.c. power source for supplying electric energy to the heating wires 8 and 4.

Figure 1:
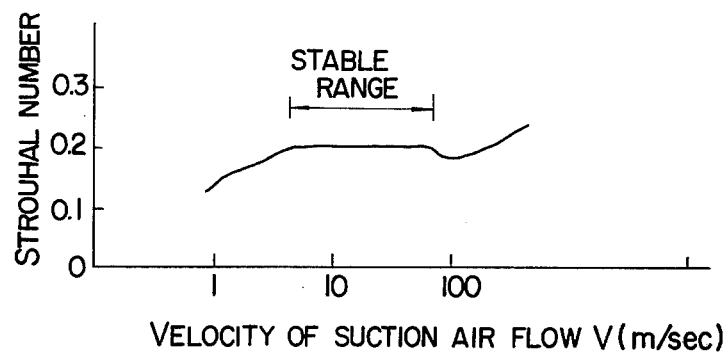
FIG. 1 is a graph to illustrate relation between the air flow velocity and the Strouhal number.
Figure 2:
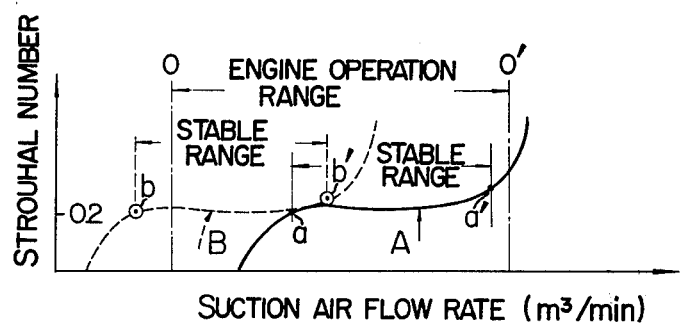
FIG. 2 is a graph to illustrate characteristic variation of the Strouhal number in dependence of air flow as well as relationship between the stable operation ranges of an internal combustion engine and a Kármán vortex type flow meter.

Detection signals available from the Kármán voltex type flowmeters incorporated in the large and small size venturi bodies 1 and 2 in the above described manner as fed to an input switching circuit 11 which is adapted to supply the detection signal from the Kármán vortex type flow meter of the small venturi 2 to a wave form shaping circuit 12 so far as the air flow rate is in the range of O to $b'$ of a curve B shown in FIG. 2 on one hand and on the other hand supply the output detection signal from the flow meter incorporated in the large size venturi body 1 to the shaper circuit 12 in the air flow rate range defined between points $b'$ and $O'$ of curve A shown in FIG. 2. Rectangular pulses after having been properly shaped in the shaper circuit 12 is fed to a known type operational circuit or arithmetic unit 13 for determining the injection quantity of a fuel mixture, thereby to control an injection valve 14 of a known type.

Figure 4:
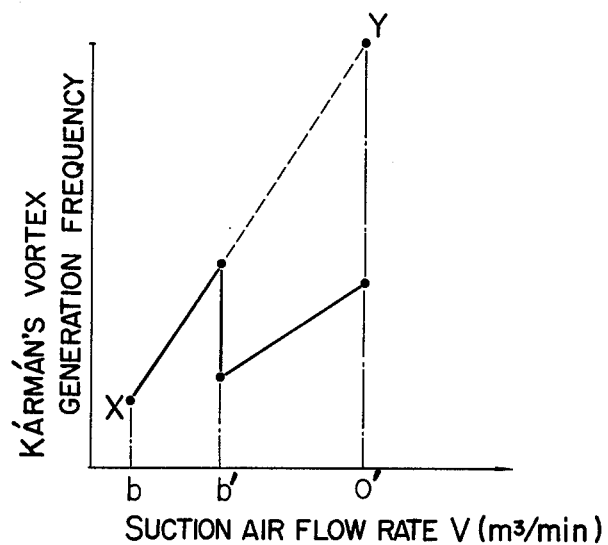
FIG. 4 shows graphically a relationship between the air flow and the frequency at which the Kármán vortexes are generated.

In order to generate the Kármán voltexes in a stable manner over the whole range of $b'$ to $O'$ in FIG. 2, the cross-sectional area of the large size venturi 1 may be slightly increased, thereby to shift the range of $a - a'$ shown in FIG. 2 to the high flow rate range. Accordingly, the frequency curve of Kármán vortex generation relative to the air flow rate will be discontinued at a point $b'$ as indicated by solid line curve in FIG. 4. Such characteristic is corrected by the operational or arithmetic circuit 13 so that a characteristic curve $x-y$ shown in FIG. 4 by solid and broken line segments is obtained, whereby a linear proportional relation can be accomplished between the Kármán vortex generation frequency and the air flow rate over the whole range $b - o'$ of the engine operation.

Figure 5:
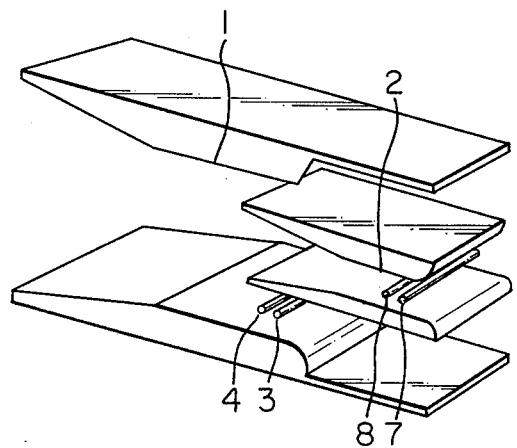
FIG. 5 is a perspective view showing a portion of an air flow meter according to another embodiment of the invention.

FIG. 5 shows another embodiment of the venturies of a structure differed from the one shown in FIG. 3. In FIG. 5, parts corresponding to those shown in FIG. 3 are denoted by the common reference numerals. As can be seen from FIG. 5, the venturis disposed in a two-dimensional array have common side walls and so profiled that the cross-sections in a plane vertical to the axis of the array are of a rectangular form. The cylindrical posts 3 and 7 as well as hot wires 4 and 8 are provided, as is shown in FIG. 5. With such arrangement, disturbances of the Kármán vortexes which may occur in the case of the cylindrical venturis along inner walls thereof can be effectively suppressed, whereby more stable pulse signal can be obtained. The arrangement shown in FIG. 5 may be installed, for example, at a position adjacent to the inlet port of an air purifier of an internal combustion engine to detect the suction air flow rate to the engine.

Referring to FIG. 6 which shows a detail arrangement of an embodiment of the input switching circuit 13 shown in FIG. 3, reference numeral 110 denotes one input terminal connected to an output terminal of the flow meter incorporated in the small size venturi. The input terminal 110 is connected to a positive or plus terminal of an operational amplifier 112 through a resistor 111. The operational amplifier 112 has a minus input terminal grounded through a resistor 113. The minus input terminal of the amplifier 112 connected to the output terminal thereof through a feed back resistor 114.

Next, description will be made on the operation of the above described circuit. When input voltage applied to the terminal 110 is represented by $V_{110}$ with resistance values of the resistors 111, 113 and 114 by $R_1$, $R_1$ and $R_3$, respectively, then the output voltage $V_{112\,out}$ of the operational amplifier 112 will be given by the following expression:

$$V_{112\,out} = (1 + \frac{R_2}{R_1}) V_{110} \quad (2)$$

Accordingly, the output signal available from the flow meter provided at the small size venturi is amplified by the circuit composed of the above described elements 110 to 114.

Referring again to FIG. 6, numeral 115 denotes a mono-stable multivibrator having an input terminal connected to the output terminal of the operational amplifier 112 and a terminal 116 connected to a voltage source through a resistor 117. A capacitor 118 is connected between the resistor 117 and the multivibrator as is shown in FIG. 6.

In operation, the mono-stable multivibrator produce a signal of a constant duration determined by the resistor 117 and the capacitor 118 for each cycle of the signal output from the operational amplifier 112.

The input switching circuit 13 further comprises an integrating circuitry which is composed of a resistor 119 having one end connected to the output terminal of the multivibrator and a capacitor 120 having one end connected to the other end of the resistor 119 and the other end grounded.

The integrating circuitry serves to smooth or integrate the output signal from the mono-stable multivibrator 115. In this connection, it is to be noted that the voltage appearing across the capacitor will become higher, as the frequency of the output signal from the mono-stable multivibrator 115 is higher. To illustrate such condition. FIG. 7 shows the relation between the output signal (having a predetermined time duration $t_o$) of the mono-stable multivibrator 115 and the voltage across the capacitor, i.e. the output voltage $V_c$ of the integrating circuitry. The relation shown in FIG. 7 can be mathmatically expressed as follows:

$$V_c = (A \cdot t_o/T) \quad (3)$$

wherein

A: amplitude of the output voltage from the multivibrator 115, and

T: period of the above output voltage. As will be appreciated, the output voltage Vc of the integrating circuitry will become smaller in amplitude, as the period T is greater or as the frequency is lower.

Referring again to FIG. 6, a comparator circuitry is provided which comprises a terminal 121 connected to a voltage source, a resistor 122 having one end connected to the terminal 121, a resistor 123 having one end connected to the other end of the resistor 122 and the other end grounded and a comparator 124 having a minus input terminal connected to one end of the capacitor 120 and a plus input terminal connected to the junction between the resistors 122 and 123.

In operation, the comparator circuitry serves to compare the output voltage $V_c$ from the integrating circuitry with a reference voltage $V_s$ produced by the resistors 122 and 123 thereby to produce an output voltage at substantially grounded level when $V_c$ is equal to or higher than $V_s$. When $V_c < V_s$, when the output voltage of the comparator circuitry has an amplitude which is equal to that of the source voltage.

In FIG. 6, a MOS gate device 125 is provided which has a drain terminal (or source terminal) connected to the output terminal of the operational amplifier 112 and a gate connected to the output terminal of the comparator 124. The MOS gate device 125 allows the output signal from the operational amplifier 112 to pass therethrough, when the output voltage of the comparator 124 is at a level equal to that of the source voltage and inhibits the output signal from the operational amplifier from passing therethrough when the output voltage from the comparator 124 is at ground level.

An amplifier circuit for amplifying the output signal from the flow meter incorporated in the large size Venturi is composed of circuit elements 126 to 130 and functions in a similar manner as the amplifier circuit (110–114) for amplifying the signal from the flow meter incorporated in the small size venturi. However, it should be noted that the circuit elements 126 to 130 are connected such that the following equation applies valid, namely:

$$V_{128\,out} = (1 + \frac{R_4}{R_3}) V_{126} \quad (4)$$

where $V_{126}$: input signal voltage at the input terminal 126, $R_3$: resistance value of the resistors 127 and 129, $R_4$: resistance value of the resistor 130, and $R_{128\,out}$: output voltage from the operational amplifier 128

There is further provided a switch circuit which comprises a resistor 131 having one end connected to the output terminal of the comparator 124, a terminal 132 connected to the voltage source, a resistor 133 having one end connected to the terminal 133, and a NPN transistor 134 having collector connected to the other end of the resistor 134 and a base connected to the other end of the resistor 131. Reference numeral 135 denotes a MOS switch having a drain terminal (or alternatively source terminal) connected to the output terminal of the operational amplifier 128, a gate terminal connected to the collector terminal of NPN transistor 134 and a source (or drain) terminal connected to the source terminal (or drain) of the MOS switch 125.

In operation, assuming that the output voltage from the comparator 124 is at the ground potential level, NPN transistor 134 is in "off" state and source voltage is applied to the gate of M$\overline{OS}$ switch 135 which is thus turned "on" thereby to allow the output signal from the operational amplifier 128 to pass therethrough. On the other hand, when the output voltage of the comparator 124 is at a level of the source voltage, then NPN transistor will become conductive, resulting in that the gate terminal of the MOS switch becomes at the ground potential level thereby to inhibit the output signal of the operational amplifier 128 from passing therethrough.

In this manner, the wave form shaper circuit 12 is applied with detection signal from either the flow meter of the small size venturi or the flow meter of the large size venturi in dependence upon whether the output voltage $V_c$ of the integrating circuit is greater or smaller than the reference voltage $V_s$.

The above described switching operation of the input switching circuit 12 is graphically illustrated in FIG. 8.

Referring to FIG. 9 which shows schematically another embodiment of the invention, the air suction conduit is composed of a first air suction conduit I and a second air suction conduit II in each of which a vortex generating means 40 is disposed. There are provided associated temperature sensitive element 30 such as thermistor at the upstream sides of the vortex generators 40 to detect the Korman vortexes generated. A throttle valve 50 is disposed in the first suction conduit or passage I is interlocked with an accelerator pedal 51. When the aperture of the throttle valve 50 exceeds a predetermined value, a throttle valve 50 disposed in the second suction passage II is enforcively opened through an interlocking mechanism composed of a crank 70 mounted on the throttle valve 50, a link 80 operatively coupled to the crank 70 by means of a pin and a crank 90 mounted on the link or lever 80. The throttle valve 60 is resiliently urged toward the closing state by means of a return spring 100. In operation, when the air flow rate is in a low range, the aperture or opening of the throttle 50 in the first passage I remains at a small value, while the throttle valve 60 in the second suction passage II is closed. In this condition, the suction air is allowed to flow only through the first suction passage I. As the aperture or opening of the throttle valve 50 in the first passage I is increased under corresponding operation of the accelerator pedal 51, the aperture of throttle valve 60 is also caused to increase through the interlocking mechanism comprising the crank 70 and the link 80. As a result of that, the air fed to the engine can pass through both the first and the second suction passages, and thus the cross-sectional area of the whole air flow is increased. Nevertheless, the air flows in the regions in which the Kármán vortex type flow meters are installed will be maintained at a relatively low velocity. Thus, the Kármán vortex flow meters can be effectively operated in a stable operation range outside of such air flow range where the frequency of Kármán vortexes generated are subjected to disturbance. In other words, the air flow rate can be accurately measured with a high reliability over a relatively wide range of the air flow rates. The signals obtained from the thermal sensitive elements of the flow meters 40 are fed to an adder circuit 15 and hence to an operational or arithmetic unit 13 for determining the injection quantity of fuel and controlling correspondingly as fuel injection valve 14.

Figure 10:
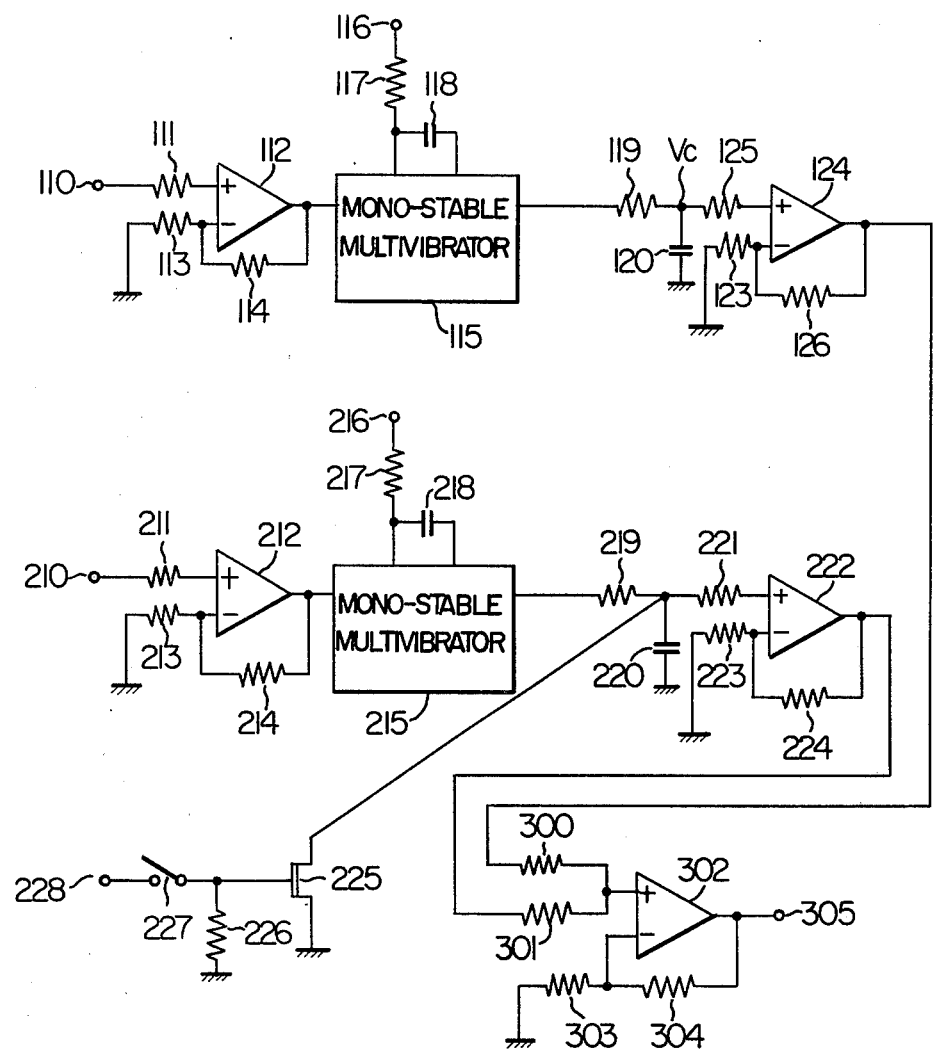
FIG. 10 is an electric circuit diagram showing in detail an arrangement of the signal adder circuit shown in FIG. 9.

FIG. 10 is a circuit diagram of an embodiment of the signal addition circuit 15 shown in FIG. 9. The circuit 15 has an input terminal 110 which is connected to the output terminals of the flow meters. It should be noted that the circuit shown in FIG. 10 has same constructions and functions as the one shown in FIG. 6 in respect of the amplifier circuit composed of the resistors 111, 113 and 114 and the operational amplifier 112; the pulse generator circuit composed of the mono-stable multivibrator 115, resistor 117 and a capacitor 118; and the integrating circuit consisting of the resistor and the capacitor 120. Accordingly, the output voltage $V_c$ of the integrating circuit becomes lower, as the period T becomes greater or as the frequency is lower, as hereinbefore described in connection with the circuit shown in FIG. 6 and the expression (3).

The circuit further comprises a resistor 125 having one end connected to the capacitor 120, an operational amplifier 124 having a plus input terminal connected to the other end of the resistor 125, a resistor 123 having one end conneted to a minus input terminal of the operational amplifier 124 and the other end grounded, and a resistor 126 connected between the minus terminal and the output terminal of the operational amplifier 124.

In operation of the above described circuitry, when the voltage across the capacitor 120 is represented by $V_{120}$ with the resistances of the resistors 125, 123 and 126 by $R_1$, $R_1$ and $R_2$, respectively, then the output voltage $V_{124\text{-}out}$ of the operational amplifier 124 is given by the following expression:

$$V_{124\ out} = (1 + \frac{R_2}{R_1}) V_{120} \tag{5}$$

where $V_{120}$ represents a voltage of a magnitude proportional to the frequency of the vortex signal representative of the air flow velocity or rate in the first suction passage I. Accordingly, when the term $(1 + R_2/R_1)$ is a constant proportional to the cross-sectional area of the first suction passage, then the output voltage $V_{124\ out}$ corresponds to the product of the frequency of air flow velocity signal and the crosssectional area of the flow passage I.

Referring again to FIG. 10, the circuit further comprises an input terminal 210 connected to the second flow meter disposed in the second air suction passage II, a resistor 211 having one end connected to the input terminal 210, an operational amplifier 212 having a plus input terminal connected to the other end of the resistor 211, a resistor 213 having one end connected to the minus input terminal of the operational amplifier 212 and other end grounded, and a resistor 214 connected between the minus input terminal and the output terminal of the operational amplifier 212.

In the operation of the just above described circuitry, when the input voltage at the terminal 210 is represented by $V_{210}$ with resistances of the resistors $R_1$, $R_1$ and $R_2$, respectively then the output voltage $V_{212\ out}$ of the operational amplifier 212 is given by the following expression;

$$V_{212\ out} = (1 + \frac{R_2}{R_1}) V_{210} \tag{6}$$

In other words, the circuitry (210–214) amplifies the output signal available from the flow meter disposed in the second suction conduit or passage.

Referring again to FIG. 10, the circuit shown therein further includes a mono-stable multivibrator 215 having an input terminal connected to the output terminal of the operational amplifier 212, a terminal 216 connected to the power source, a resistor 217 having one end connected to the terminal 216 and the other end connected to the multivibrator 215, and a capacitor 218 having one end connected to the multivibrator 215 and the other end connected to the other end of the resistor 217.

In operation of this circuitry, the mono-stable multivibrator 215 produces a signal of a predetermined time duration determined by the resistor 217 and the capacitor 218 for every cycle of the signal output from the operational amplifier 212.

An integrating circuitry is also provided which comprises a resistor 219 having one end connected to the output terminal of the mono-stable multivibrator and a capacitor 220 having one end connected to the other end of the resistor 219 and the other end grounded. The integrating circuitry sources to smooth the output signal of the monostable multivibrator 215. As hereinbefore described, the voltage appearing across the capacitor 220 becomes higher, as the frequency of the output signal from the multivibrator 215. In other words, the output voltage $V_c$ of the integrating circuitry (219, 220) will be more lowered, as the period T becomes longer or the frequency becomes lower, as will be understood from the discussion about the expression (3).

The circuit shown in FIG. 10 further includes a circuitry or circuit portion which comprises a resistor 221 having one end connected to the capacitor 220, an operational amplifier having a plus input terminal connected to the other end of the resistor 221, a resistor 223 having one end connected to a minus input terminal of the operational amplifier 222 and the other end grounded, and a resistor 224 connected between the minus input terminal and an output terminal of the operational amplifier 222.

In operation of the above circuitry, when the voltage appearing across the capacitor 220 is represented by $V_{220}$ with resistances of the resistors 221, 223 and 224 by $R_1$, $R_1$ and $R_2$, respectively, the output voltage $V_{220\,out}$ of the operational amplifier 222 is given by the following expression:

$$V_{222\,out} = (1 + \frac{R_2}{R_1}) V_{222} \qquad (7)$$

Since the voltage $V_{220}$ has a magnitude which is proportional to the frequency of the signal representing the air flow velocity or rate within the first flow passage, the output voltage $V_{222\,out}$ of the operational amplifier 222 will be proportional to the product of the air flow velocity in the first passage I and the crosssectional area thereof, assuming that the term $$(1 + \frac{R_2}{R_1})$$

is a constant proportional to the cross-sectional area of the passage I.

The circuit shown in FIG. 10 further includes a $\overline{MOS}$ switch 225 having a drain electrode connected to one end of the capacitor 220 and a source electrode grounded, a resistor 226 having one end connected to a gate electrode of the $\overline{MOS}$ switch 225 and the other end grounded, and a throttle switch 227 having one contact connected to the end of the resistor 226 and the other contact connected to a voltage source terminal 228.

In operation of the above circuitry, when the throttle switch 227 is "off" or opened, the gate of the $\overline{MOS}$ switch 225 is at ground potential level, whereby the $\overline{MOS}$ switch 225 is in the non-conductive state. On the other hand, when the throttle switch 227 is closed, the gate of the $\overline{MOS}$ switch 225 will be at the source voltage level, resulting in the conductive state of the $\overline{MOS}$ switch 225. In this manner, when the throttle switch 227 is in the closed state which is brought about by the closed throttle valve, the voltage across the capacitor 220 will become zero and thus no output voltage of the operational amplifier 222 will be produced.

The circuit of FIG. 10 further includes a resistor 300 having one end connected to the output terminal of the operational amplifier 122, a resistor 301 having one end connected to the output terminal of the operational amplifier 222 and the other end connected to the other end of the resistor 300, an operational amplifier 302 having a plus input terminal connected to the other end of the resistor 300, a resistor 303 having one end connected to a minus input terminal of the operational amplifier 302 and the other end grounded, a resistor 304 connected between the minus input terminal and an output terminal of the operational amplifier 302, and an output terminal 305 connected to the output terminal of the operational amplifier 302.

In operation of the above circuitry, when the plus input voltage, the minus input voltage and the output voltage of the operational amplifier 302 are represented by $V_+$, $V_-$ and $V_{302\,out}$, respectively, the following equation will apply to the plus input terminal voltage, namely, $$\frac{V_{122\,out} - V_+}{R_A} = \frac{V_+ - V_{222\,out}}{R_A} \qquad (8)$$

where $R_A$ represents the resistance values of the resistors 300 and 301. Accordingly, $$V_+ = \frac{A_{122\,out} + V_{222\,out}}{2} \qquad (9)$$

On the other hand, following equation will apply to the minus input terminal voltage:

$$\frac{V_-}{R_A} = \frac{V_{302\,out} - V_-}{R_B} \qquad (10)$$

where $R_A$ and $R_B$ represents resistance values of the resistors 303 and 304, respectively.

Accordingly, $$V_- = \frac{R_A}{R_A + R_B} V_{302\,out} \qquad (11)$$

When the stable condition for the operational or differential amplifier 302 that $V_- = V_+$ is taken into consideration, $$\frac{V_{122\,out} + V_{222\,out}}{2} = \frac{R_A}{R_A + R_B} V_{302\,out} \qquad (12)$$

Thus, $$V_{302\,out} = \frac{1}{2} (1 + \frac{R_B}{R_A})(V_{122\,out} + V_{222\,out}) \qquad (13)$$

As will be understood from the expression (13), the output voltage signal of the operational amplifier 302 is proportional to a sum of the product of the frequency of signal representing the air flow velocity in the first flow passage and the cross-sectional area thereof and the product of the frequency of signal representing the air flow rate in the second flow passage and the cross-sectional area thereof.

FIG. 11 shows another embodiment of the flow meter according to the invention. The air suction conduit comprises a first suction or intake passage I and a second passage II. As is in the case of the embodiment shown in FIG. 9, vortex generation means 40 are disposed in the passages I and II and there are also provided thermal sensitive elements 30 at the upstream side of the Kármán vortex generation means 40. A throttle valve 50 which is disposed in the first passage I is interlocked with an accelerator pedal 51. A crank 72 is rotatably mounted on a shaft common to the throttle valve 50 disposed in the suction passage I. A diaphragm 82 is mounted on a connecting member 83 at one side thereof exposed to atmosphere. The other side of the diaphragm 82 is sealingly closed to define a diaphragm chamber which is communicated with the first passage I. The connecting member 83 is pivotally connected to a crank 92 which in turn is mounted rotatably on a common shaft of the throttle valve 60 disposed in the passage II, and has a return spring 100. In operation, in the range of low air flow rates, the throttle valve 60 located in the second passage II is closed, as will be seen from FIG. 11, as a result of which the suction air is allowed to flow only through the first passage I. When the air flow rate in the first passage is increased through corresponding operation of the accelerator pedal 51, the diaphragm 82 is moved upwardly against the force of the return spring 110 due to a negative pressure produced in the passage I and transmitted to the diaphragm chamber. Consequently, the throttle valve 60 is opened through the connecting member 83 and the crank 92. In this condition, suction air can flow through both the first and second passages I and II. Thus, the cross-sectional area of the air flow is increased. Nevertheless, the velocity of air flow in the vicinity of the Kármán flow meters are maintained at a relatively low value and the flow meters can fuction in a stable operation range thereof to measure air flow rates over a wide range with a high accuracy. The signals available from the Kármán vortex type flow meters are fed to the adder circuit 15 described hereinbefore and hence applied to the arithmetic unit 13 for determining the injection quantity fuel and controlling corresponding the fuel injection valve 14. In this way, the later can be controlled in a stabilized manner with an enhanced accuracy.

As will be appreciated from the foregoing description, it is possible according to the teachings of the invention to positively measure the suction air flow over the whole range of engine operations including low speed and high speed operation regions with a high accuracy. The air flow meters according to the invention can be implemented inexpensively and used advantageously as the air flow detecting apparatus for the electronic fuel injection apparatus. In the illustrated embodiments, hot wires are employed as detector means for detecting Kármán vortexes. However, the invention is never restricted to the use of such hot wires. Other types of vortex detecting means such as temperature sensors, pressure sensors or the like may be equally employed.

We claim:

1. An air flow metering apparatus for an internal combustion engine in which suction air flow fed to said engine is measured by a Kármán vortex type air flow meter disposed in an air suction passage, comprising at least two air suction passages each of which has a Kármán vortex type flow meter disposed therein, and input switching circuit means for receiving output signals from said vortex flow meters and for generating an output signal utilizing only the input signal from a first of said vortex flow meters when said input signal is below a predetermined reference value and utilizing the output of another of said flow meters when said reference value is exceeded, said reference value being set so as to result in detection of only stable vortexes over the whole operational range of the internal combustion engine, wherein one of said flow meters is disposed in the narrowest portion of a small size venturi having a suction passage of a relatively small crosssectional area, while the other flow meter is disposed in an annular space between the narrowest portion of a small venturi and a large venturi having a suction passage of a relatively large crosssectional area, said small venturi being concentrically disposed within the large venturi.

2. An air flow metering apparatus as set forth in claim 1, wherein both of said large size and small size venturies are of a cylindrical configuration.

3. An air flow metering apparatus as set forth in claim 1, wherein said large size venturi and said small size venturi have common side walls and are composed of tubular bodies having cross-sections of a substantially rectangular form.

4. An air flow metering apparatus for an internal combustion engine in which suction air flow fed to said engine is measured by a Kármán vortex type of air flow meter disposed in an air suction passage, comprising at least two air suction passages each of which has a Kármán vortex type flow meter disposed therein, and input switching circuit means for receiving output signals from said vortex flow meters and for generating an output signal utilizing only the input signal from a vortex flow meter in a first of said passages when the flow through the other of said passage is below a predetermined value and utilizing the sum of the outputs of said flow meters when said value is exceeded, said reference value being set so as to result in detection of only stable vortexes over the whole operational range of the internal combustion engine.

5. An air flow metering apparatus as set forth in claim 4, further comprising a first throttle valve disposed in a first air suction passage and operatively coupled to an accelerator pedal, and a second throttle valve disposed in a second air suction passage and operatively coupled to said first throttle valve through a mechanical coupling means.

6. An air flow metering apparatus as set forth in claim 4, further comprising a first throttle valve disposed in a first air suction passage and coupled operatively to an accelerator pedal, a diaphragm means adapted to respond to a negative pressure produced in said first air suction passage, and a second throttle valve disposed in a second air suction passage and coupled operatively to said diaphragm means.

7. An air flow metering apparatus as set forth in claim 4, wherein both of said air suction passages are of cylindrical configuration.

8. An air flow metering apparatus as set forth in claim 4, wherein both of said air suction passages have common side walls and composed of tubular bodies having cross sections of a substantially rectangular form.

9. An air flow metering apparatus according to claim 4, further comprising a first throttle valve in said first flow path, a second throttle valve in said other flow path, first means interconnecting one of said throttle valves with an accellerator pedal, second means interconnecting said one throttle valve with the other of said throttle valves for controlling the degree of opening of said other throttle valve as a function of the degree of opening of said one throttle valve, and throttle switch means responsive to the position of one of said throttle valves for providing a signal to said input switching means.

10. An air flow metering apparatus according to claim 9, wherein said throttle switch means is closed in response to closing of the throttle valve in said other flow path.

11. An air flow metering apparatus according to claim 1, further comprising means for utilizing the output of said switching circuit means for regulating the amount of fuel supplied to said engine.

* * * * *